United States Patent [19]

Hauser et al.

[11] 4,144,028

[45] Mar. 13, 1979

[54] TINT COMPOSITIONS FOR NYLON HAVING IMPROVED FUGITIVITY PROPERTIES

[75] Inventors: Peter J. Hauser, Inman, S.C.; James E. Hendrix, La Grange, Ga.; Hans H. Kuhn, Spartanburg, S.C.

[73] Assignee: Milliken Research Corporation, Spartanburg, S.C.

[21] Appl. No.: 720,220

[22] Filed: Sep. 3, 1976

[51] Int. Cl.² .......................... D06P 3/00; D06P 5/08
[52] U.S. Cl. ........................................ 8/164; 8/18 R; 8/DIG. 21
[58] Field of Search ...................... 8/164, 18, DIG. 21

[56] References Cited

U.S. PATENT DOCUMENTS 3,157,633  11/1964  Kuhn ........................................ 8/50
3,929,406  12/1975  Farmer et al. ........................... 8/164

Primary Examiner—Herbert J. Lilling
Attorney, Agent, or Firm—Glen M. Burdick; H. William Petry

[57] ABSTRACT

Tint compositions for nylon having improved fugitivity properties comprising an admixture of a colorant having the general formula $$R-N-[(CH_2CH_2O)_nH]_2\}_x$$

wherein R is an organic dyestuff radical, x is an integer of 1 to 6, and the product of 2n times x is from about 200 to about 300, and a minor effective amount of a free radical inhibitor to retard free radical interaction between the colorant and the nylon.

5 Claims, No Drawings

TINT COMPOSITIONS FOR NYLON HAVING IMPROVED FUGITIVITY PROPERTIES

This invention relates to tint compositions. In one aspect it relates to tint compositions for nylon having improved fugitivity properties.

Colorants, such as fugitive tints, are often used to color code textiles during production and/or finishing operations to identify certain synthetic or natural fibers. For example, the fibers may be tinted during the spinning of the fibers into yarns and the utilization of the yarns in knitting or weaving operations to ensure that undesirable fibers or yarns are not present. Such tints are then removed during one of the last finishing operations prior to sale. To be acceptable, a fugitive tint should be capable of being easily removed, even after exposure to extreme conditions which might be encountered during the production and finishing of the textile. Also, the tint should have good color stability to minimize fading during exposure to heat and/or light, conditions which may be encountered during processing of the tinted fibers into the final product.

Fugitive tints are generally classified as water fugitive or solvent fugitive. For example, dyestuffs containing one or more polyethyleneoxy groups are generally considered water fugitive tints, whereas dyestuffs containing one or more polypropyleneoxy groups are considered solvent fugitive. Thus, the particular choice of tints chosen depend largely upon the finishing operations of the fiber and the fugitivity properties of the tint.

Fugitive tints which have achieved wide acceptance in the textile industry are the polyethylene oxide tints described in U.S. Pat. No. 3,157,633. Such tints are a combination of a dyestuff radical and one or more polyethyleneoxy groups. Dyestuff radicals disclosed in the patent include nitroso, nitro, azo, diphenylmethane, triarylmethane, xanthene, acridene, methine, thiazole, indamine, azine, oxazine, or anthraquinone radicals. Preferably, such radicals are attached to the polymeric constituents of the tint compositions by an amino nitrogen.

While the above tints have exhibited the desired fugitivity properties on most fibers, both synthetic and natural, problems have been encountered when employing such tints on nylon, especially amorphus, undrawn nylon and fully drawn cationic dyeable nylon. The major problem encountered has been that the tints of the prior art, when used on the beforedescribed nylon fibers, are not easily removed, under severe processing conditions and, in many instances, have resulted in a permanent discoloration of the nylon fibers.

It is, therefore, an object of the invention to provide a fugitive tint composition for nylon.

Another object of the invention is to provide a fugitive tint composition for amorphus, undrawn nylon and fully drawn cationic dyeable nylon.

These and other objects of the invention will be apparent to those skilled in the art from a reading of the following detailed description.

According to the present invention, we have discovered improved tint compositions for nylon, especially amorphus, undrawn nylon and fully drawn cationic dyeable nylon. Broadly, the improved tint compositions of the invention comprise a major effective amount of a colorant to provide the desired color properties to the tint composition and a minor effective amount of a free radical inhibitor to retard free radical interaction between the colorant and the nylon. More specifically, the improved tint compositions of the invention comprise an admixture containing a major amount of a colorant having the general formula $$R + N-[(CH_2CH_2O)_nH]_2 +_x$$

wherein R is an organic dyestuff radical, x is an integer of 1 to 6, and the product of 2n times x is from about 200 to about 300, and from about 0.5 to 5 weight percent, based on the amount of colorant, of a free radical inhibitor.

The colorants useful in the production of the fugitive tint compositions for amorphus, undrawn nylon and fully drawn cationic dyeable nylon of the present invention and having the above-described formula are further described in U.S. Pat. No. 3,157,633 to Kuhn, herein incorporated by reference.

The amount of colorant employed in the tint compositions of the invention can vary widely, but will be the major constituent of the concentrated tint composition. The amount of the colorant will largely be dependent upon the particular shade of tint desired, the color of the colorant, and the amount of the free-radical inhibitor employed.

The amount of free radical inhibitor employed in the tint compositions of the present invention can vary widely, provided same is an effective minor amount to retard interaction and chemical bonding of the colorant to the nylon fibers. Generally, the amount of free-radical inhibitor is employed in an amount of from about 0.5 to 5 weight percent, based on the weight of the colorant constituent.

The term free-radical inhibitor as used herein is to be understood to mean any compound which is more reactive to free radicals than the colorant and thus preventing free radical reactions, such as free radical polymerization, between the nylon and the colorant. Thus, any suitable free-radical inhibitor meeting the above definition can be employed. Especially desirable results have been obtained when the free radical inhibitor is thiourea, hydroquinone, or derivatives thereof, such as the monoethyl ether of hydroquinone, mercaptans, p-benzoquinone, sodium dimethyldithiocarbamate, butylated hydroxy toluene and the like.

In order to more fully describe the present invention, the following examples are set forth. However, it is to be understood that such examples are for illustrative purposes only and should not be considered as limiting the spirit or scope of the invention.

EXAMPLE I

An aqueous tint containing mixture was formed by admixing 5 weight percent of a colorant having the structural formula

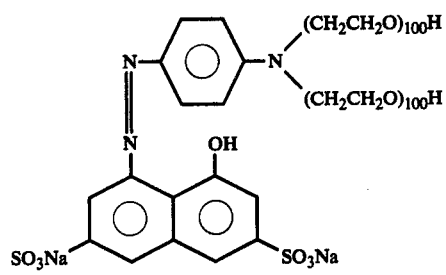

with 95 weight percent of an aqueous spin finish composition, a processing aid used by fiber manufacturers in the production of fibers. Generally the aqueous spin finish compositions contain lubricants, anti-static agents, emulsifying agents and the like.

The aqueous tint containing mixture was then applied to undrawn nylon-6 by soaking the nylon in the mixture for a period of time to insure that the nylon was thoroughly wetted with the mixture. The wetted nylon was cold drawn to a ratio of 3:1. The cold drawn nylon was heated to a temperature of 180° F. for 5 minutes and thereafter placed in an autoclave.

The cold drawn tinted nylon in the autoclave was heated, under pressure, to a temperature of 280° F. for 3 minutes. The autoclave was then vented for 2 minutes to relieve the pressure on same. Thereafter, a vacuum was pulled on the autoclave for 3 minutes. The autoclave cycle of heating, venting and pulling a vacuum was repeated 4 times.

The tinted, heat set nylon was removed from the autoclave and washed for 1 minute with cold water. The washed nylon was dried in air, examined, and found to contain severe staining.

EXAMPLE II

A tint containing mixture was formed by admixing 5 weight percent of the colorant of Example I and 0.2% of thiourea, with 94.8 weight percent of the aqueous spin finish composition of Example I. The tint containing mixture was then applied to undrawn nylon-6 and the wetted nylon was treated according to the procedure set forth in Example I. After rinsing and drying, the nylon was found to contain no residual colorant.

EXAMPLE III

A tint containing mixture was formed by admixing 5 weight percent of the colorant of Example I, and 0.22% of hydroquinone, with 94.78 weight percent of the aqueous spin finish composition of Example I. The tint containing mixture was applied to undrawn nylon-6 and the wetted nylon was treated according to the procedures of Example I. The rinsed and dried nylon contained no residual colorant.

Having thus described the invention, we claim:

1. Fugitive tint compositions for amorphus, undrawn nylon or fully drawn cationic dyeable nylon comprising an admixture of a colorant having the formula

wherein R is an organic dyestuff radical, x is an integer of 1 to 6, and the product of 2n times x is from about 200 to 300, and a minor effective amount of a free radical inhibitor.

2. The fugitive tint composition of claim 1 wherein said free-radical inhibitor is present in an amount of from about 0.5 to about 5 weight percent, based on the weight of said colorant.

3. The fugitive tint composition of claim 2 wherein said free radical inhibitor is selected from the group consisting of thiourea, hydroquinone, the monoethyl ether of hydroquinone, mercaptans, p-benzoquinone, sodium dimethyldithiocarbamate and butylated hydroxy toluene.

4. The fugitive tint composition of claim 3 wherein said free radical inhibitor is thiourea.

5. The fugitive tint composition of claim 3 wherein said free radical inhibitor is hydroquinone.